Sept. 19, 1961 G. D. WEBBER 3,000,510

CASES FOR GAGE BLOCKS

Filed Oct. 9, 1958

INVENTOR.
GEORGE D. WEBBER
BY George M. Soule
ATTORNEY

United States Patent Office 3,000,510

Patented Sept. 19, 1961

3,000,510

CASES FOR GAGE BLOCKS

George D. Webber, Lakewood, Ohio, assignor, by mesne assignments, to Webber Gage Company, Cleveland, Ohio, a corporation of Ohio Filed Oct. 9, 1958, Ser. No. 766,235

5 Claims. (Cl. 211—13)

This invention relates to a compact case, storage rack or holder for gage blocks for enabling all the gage blocks of a set or assortment of gage blocks to be made individually accessible with a minimum of effort on the part of the user while affording adequate protection of the blocks against contact with each other and against falling out of place under all reasonably expectable circumstances while nevertheless exposing considerable areas of each block for easy inspection of surface condition and identification of the measurements that are affordable by the various blocks.

Gage blocks although usually made of highly wear resistant materials can easily be rendered temporarily useless at vitally critical times by accidental misuse. The blocks, therefore, are usually laid flatwise in more or less recumbent positions in individual cells in their cases. From such positions the blocks cannot be picked up easily; and such an arrangement of gage blocks occupies an undesirably large package volume or space horizontally. Gage block cases or holders have been made in which the various blocks of the set are disposed more or less in upright positions in cells, or sockets. That expedient conserves horizontal space and facilitates picking up of the blocks, but the sockets if deep enough to insure (e.g.) complete separation of the blocks from each other are extremely difficult to keep clean, and such arrangement of blocks, results in having to obscure the identification marks of many of the blocks behind others of the set, and, of course, results in preventing ready inspection of relatively large areas of most of the blocks of the set for ascertaining their main surface condition.

The present subject gage block case or holder, among other advantages, enables easy inspection of large areas of each block for surface condition, facilitates identification and selection or pick-up of the blocks as well as facilitates replacement of the blocks in proper positions in the case; is compact for conserving of horizontal space; has no surfaces which are difficult to keep clean, and retains the blocks against falling out of position in the case despite tilting of the case greatly out of its normal rest or horizontal position in any possible direction or sudden jolting of the case in practically any position of it.

Figure 1:
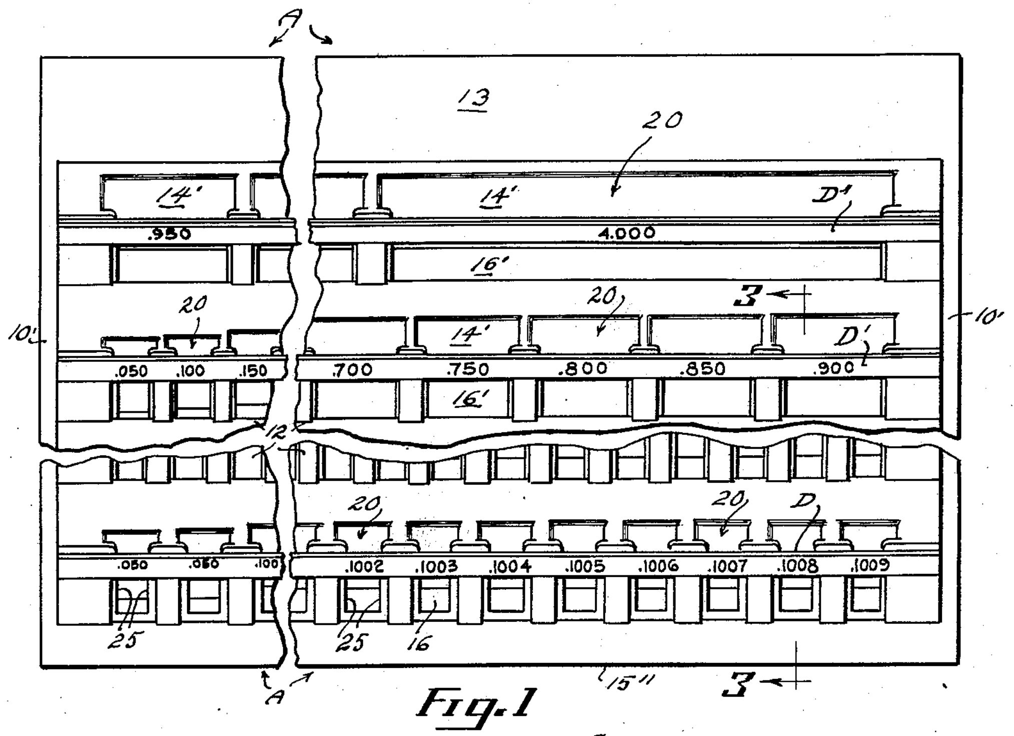
Figure 2:
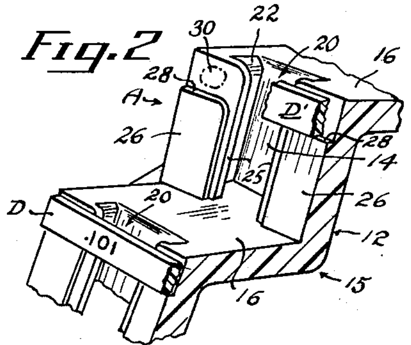
Figure 3:
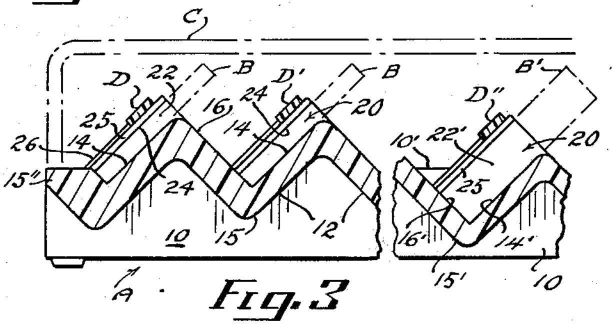
Figure 4:
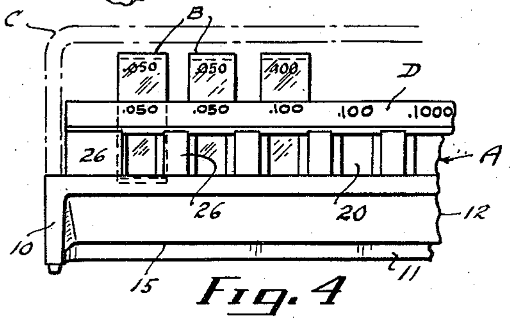

In the drawing, FIG. 1 is a top or plan view of four corner portions of the rack or body A of the present subject gage block case. FIG. 2 is a fragmentary perspective view of a small left side marginal portion of the case body portion A. FIG. 3 is a vertical sectional fragmentary view taken at 3—3 on FIG. 1 and showing, in broken lines, a portion of a cover C for the body A. FIG. 4 is a fragmentary front view of the case body A, showing three gage blocks B as contained and displayed in the rack or body portion A.

Case body A is designed to be die-formed from a single piece of suitable substantially rigid plastic material except for relatively thin gage-block-identification strips D, D′, D″ which, as shown, are formed from similar (e.g. extruded) plastic strip material adapted to be cemented or otherwise fastened (e.g. by screws) tightly to the body A. The body A of the case has, for example on its under side, laterally spaced depending parallel side flange or upright wall base portions 10 interconnected by a depending flange or rear wall portion 11, FIG. 4 only, the depending flange portions, as viewed from the under side of the case, forming a three-sided or double L-shaped figure (not shown) bridged by an integral gage-block-supporting bed or web portion 12. The bed portion 12, when cut by any of a number of fore-and-aft vertical planes, as shown for example in FIG. 3, comprises a series of stair-like ribs or corrugations 15 of right angular cross section, terminating forwardly of the case body in a finishing bead or rib 15″ which, as shown in FIGS. 1 and 3, is flat on its top side, coplanar with the top sides 10′ of wall or flange portions 10 and a top rearwardly disposed face 13 whereby to support adjacent coplanar lower surface or rim portions of the cover C, FIGS. 3 and 4.

The gage block main "rest" surfaces 14 and 14′ of the ribs 15 and 15′ are rearwardly inclined so as to face generally forwardly of the case body A; and the surfaces 16 and 16′ of the ribs which are abutted by relatively narrow lower "edge" surfaces of the gage blocks face generally rearwardly and are disposed at right angles to the rib surfaces 14 and 14′. Thereby the measurement identifications of all the gage blocks (e.g. as shown in FIG. 4), assuming the blocks are properly placed in the case, are all clearly visible from the front of the case and the relative spacing of all the fully exposed portions of the gage blocks is such as to allow plenty of finger room for easy extraction of the blocks from the case.

In typical sets of gage blocks the smaller blocks of the set, such as shown by broken lines B in FIG. 3, are stood generally upright, wherefore their measurement-identifying values (indicated as at .050, .050, .100 in FIG. 4) are most easily seen when placed on one broad face near one end margin or as illustrated; whereas a few blocks, such as represent unitary values (e.g. a 4 inch block such as intended to be received in the space shown at the upper right in FIG. 1—one such being indicated at B′ in FIG. 3), are made in lengths representing their fiducial dimensions and in widths somewhat greater than the non-fiducial lengths of the small-value-representing blocks B. Thus the represented measuring values (not illustrated) appear horizontally along upper margins of the blocks B′ as viewed from the front of the case (left toward right, FIG. 3).

The gage blocks B′ are placed at the rear of the case body A with their measuring dimensions generally horizontal; and the ribs 15′ at the rear of the bed portion 12 of the case are depressed or lowered relative to the principal horizontal plane of the ribs 15 which are near the front of the case, or as illustrated in FIG. 3. That view shows one such relatively lowered rib 15′, and, as illustrated, the gage blocks B′ (one shown supported by its surfaces 14′ and 16′) have their uppermost edges (those adjacent the under side of the cover C) in about the same horizontal plane as are the uppermost ends or edges of the forwardly disposed relatively thinner blocks B.

Important features of the present invention, as exhibited by all views on the drawing, are the means whereby relatively large areas of the measurement-identifying faces of the gage blocks are clearly exposed, while nevertheless the gage blocks are kept out of contact with each other, can be easily manipulated without tools, and are made readily identifiable with their proper locations in the case in the operation of returning the gage blocks to the case after use. Each cell or reception space 20 for a gage block is defined by a rest surface 14 (or 14′), a pair of side guide surfaces 22 (or 22′), on respective partitions separating the cells, a bottom or abutment surface 16 (or 16′) and the rearwardly disposed faces 24 of a pair of horizontally spaced apart flanges 25 parallel to and overhanging the rest surfaces 14 (or 14′). The surfaces of the cells 20 (e.g., principally 14, 22 and 24) define T-shaped sockets (preferably bell mouthed on three sides or as shown) into which the gage blocks are readily insertable with adequate snugness as will be apparent. Each cell 20 is slightly larger in transverse dimensions than the corresponding dimensions of the gage block to be received by it. In the above described construction the T-shaped partitions which separate and largely define the individual cells for the gage blocks have their T-arms overhanging the rest surfaces 14 (or 14') distances considerably less than the widths of the abutment surfaces 16 (or 16') measured forwardly from and perpendicularly to the rest surfaces, so that the gage blocks in adjacent rows are fairly widely spaced apart in directions normal to their main or value-identified faces. Thus the blocks can be manipulated by grasping the relatively opposite broad or narrow faces or edges, preferably the narrow ones which are not used as measuring surfaces.

The proper places for the various gage blocks are marked on the identification strips D, D' and D'' as is made apparent in FIGS. 1, 2 and 4. Those strips, D etc. are preferably secured as by cement near the upper open ends of the effective T-shaped cells 20 for the gage blocks. Pads 26 moulded on the upwardly and forwardly exposed surface portions of the forward walls of the cells 20 form locating ledges 28 (FIG. 2) for the identification strips, so that (assuming cement is applied as at 30, FIG. 2, to each or several of the front faces above the ledges 28) no other locating means will be required in order to insure proper placement of the strips D, D' and D'' parallel to each other. The identification strips can also be secured inexpensively by screws, not shown (self tapping screws preferred).

As should be apparent from comparison of FIGS. 1, 2 and 3, the present subject gage block case can be very easily cleaned although, in effect, the cells 20 function as would dead-ended pockets for the blocks. Very little dirt or abrasive dust is apt to accumulate unnoticed in the cells 20 since, when the gage block of a particular cell is removed for use, all surfaces of the cell can be easily inspected. Any accumulations of dirt or dust in any cell can easily be brushed out onto the surfaces 16, assuming the case body A is tilted forwardly so that the surfaces 16 are approximately horizontal; and then the surfaces 16 can be wiped off as with an oiled cloth or sponge.

The system of construction of the present gage block case, as explained above, can, of course, be considerably modified. For example: while the gage-block-supporting surfaces (e.g. 14 and 16) of the cells 20 are most advantageously disposed at 45° relative to the bottom plane of the case in most sets of gage blocks, such disposition can be altered more or less and can be different for the relatively thinner and thicker blocks (measured normally to the surfaces 14 and 14') if desired.

I claim:

1. A case or holder for rectangular gage blocks, comprising a body adapted to be made in one piece as a plastic molding and having supporting base or sill portions and a recumbent web or bed portion of stair-like cross section providing substantially imperforate rearwardly inclined rests for main or principal area surfaces of the gage blocks and contiguous substantially imperforate arresting abutments for surfaces of the blocks disposed at right angles to their main or principal area surfaces, and having a series of T-shaped partitions extending forwardly from the rest surfaces distances considerably less than the widths of associated arresting abutments measured perpendicularly of the rest surfaces and with their T arms overhanging the rest surfaces in pairs and spaced apart horizontally, whereby the gage blocks can be individually slidably retained by said T arms, each readily accessibly disposed to being grasped and picked up by human fingers, while substantial front face areas of the blocks including areas adjacent the arresting abutments are exposed to view.

2. The gage block case according to claim 1 wherein the rest and abutment surfaces for the gage blocks are disposed at approximately 45° relative to the principal horizontal plane of the bed or web portion.

3. The gage block case according to claim 1, wherein forwardly exposed faces of the T arms are stepped to provide generally upwardly facing, position-locating abutments for supporting valve-identifying strips.

4. The gage block case according to claim 1, wherein the upwardly exposed faces of the stair-like bed or floor portions provide upwardly exposed apex regions of the bed or floor portion at relatively different heights above the principal horizontal plane of the sill portions, so that gage blocks of a set whose components have different dimensions measured upwardly and parallel to the main rest surfaces for the blocks can be accommodated with their tops at about the same elevation above such horizontal plane.

5. In a case or holder for gage blocks, a main supporting body for the blocks comprising a horizontal bed member having rows of reception spaces for the blocks formed by a stair-like wall with exposed contiguous surfaces disposed at about 45° to the horizontal, providing rearwardly inclined rest surfaces for the blocks and abutment surfaces against which the blocks are retained by gravity, partition members integral with and extending forwardly equal distances from associated rest surfaces and having forwardly exposed surfaces parallel to the rest surfaces, and measurement-value-indicating strips extending horizontally across the forward surfaces of the partition members, the lower edges of the strips being located above the abutment surfaces distances considerably greater than the transverse widths of the strips so as to expose lower, forwardly facing surfaces of the blocks in regions between the partition members.

References Cited in the file of this patent

UNITED STATES PATENTS

| | | |
|---|---|---|
| 320,949 | McElroy | June 30, 1885 |
| 1,266,708 | Ozanne | May 21, 1918 |
| 1,587,935 | Brunhoff | June 8, 1926 |
| 1,616,602 | Williams | Feb. 8, 1927 |
| 2,090,440 | Davis | Aug. 17, 1937 |